(12) United States Patent
Greiner et al.

(10) Patent No.: US 10,839,336 B2
(45) Date of Patent: Nov. 17, 2020

(54) UNMANNED DELIVERY

(71) Applicant: FLIR DETECTION, INC., Stillwater, OK (US)

(72) Inventors: Helen Greiner, Wayland, MA (US); Jason Walker, Medford, MA (US); Christopher Owen Norman, Somerville, MA (US); Felipe Bohorquez, Cambridge, MA (US); Alexey Zaparovanny, Westford, MA (US)

(73) Assignee: FLIR DETECTION, INC., Stillwater, OK (US)

( * ) Notice: Subject to any disclaimer, the term of this patent is extended or adjusted under 35 U.S.C. 154(b) by 537 days.

(21) Appl. No.: 14/581,027

(22) Filed: Dec. 23, 2014

(65) Prior Publication Data

US 2017/0011333 A1    Jan. 12, 2017

Related U.S. Application Data

(60) Provisional application No. 61/920,913, filed on Dec. 26, 2013.

(51) Int. Cl.
   *G06Q 10/08*      (2012.01)
   *B64D 47/08*      (2006.01)
   (Continued)

(52) U.S. Cl.
   CPC ............ *G06Q 10/083* (2013.01); *B64D 1/02* (2013.01); *B64D 47/08* (2013.01);
   (Continued)

(58) Field of Classification Search
   CPC ........ G06Q 10/083; B64D 1/02; B64D 47/08; B64D 27/00; B64D 27/24; G05D 1/101;
   (Continued)

(56) References Cited

U.S. PATENT DOCUMENTS 7,418,320 B1    8/2008  Bodin et al.
8,544,787 B2    10/2013 Lee et al.
(Continued)

FOREIGN PATENT DOCUMENTS

CN    201712787 U    1/2011
CN    103010485 A    4/2013
(Continued)

OTHER PUBLICATIONS

Donadel et al., Modeling and Control of a Tiltroto UAV for Path Tracking. Proceedings of the 19th World Congress The International Federation of Automatic Control. pp. 3839-3843, Aug. 24-29, 2014.
(Continued)

*Primary Examiner* — Behrang Badii
(74) *Attorney, Agent, or Firm* — Haynes and Boone, LLP

(57) ABSTRACT

A method for unmanned delivery of an item to a desired delivery location includes receiving, at an unmanned vehicle, first data representative of an approximate geographic location of the desired delivery location, receiving, at the unmanned vehicle, second data representative of a fiducial expected to be detectable at the desired delivery location, using the first data to operate the unmanned vehicle to travel to the approximate geographic location of the desired delivery location, upon arriving at the approximate geographic location of the desired delivery location, using the second data to operate the unmanned vehicle to detect the fiducial; and upon detecting the fiducial, using the fiducial to operate the unmanned vehicle to travel to the delivery location and deliver the item.

52 Claims, 11 Drawing Sheets

(51) Int. Cl.

| | | |
|---|---|---|
| *B64D 1/02* | (2006.01) | |
| *G06K 7/10* | (2006.01) | |
| B64C 39/02 | (2006.01) | |
| H04L 12/58 | (2006.01) | |
| H04W 4/14 | (2009.01) | |
| B64D 27/00 | (2006.01) | |
| B60K 1/00 | (2006.01) | |
| B63G 8/08 | (2006.01) | |
| B63H 21/17 | (2006.01) | |
| A47G 29/14 | (2006.01) | |

(52) U.S. Cl.
CPC .......... *G06K 7/10722* (2013.01); *A47G 29/14* (2013.01); *B60K 1/00* (2013.01); *B63G 8/08* (2013.01); *B63H 21/17* (2013.01); *B64C 39/024* (2013.01); *B64C 2201/128* (2013.01); *B64D 27/00* (2013.01); *H04L 51/24* (2013.01); *H04W 4/14* (2013.01)

(58) Field of Classification Search
CPC ...... G05D 1/0094; G05D 1/104; G05D 1/042; G05D 1/0088; G06K 7/10722; B63G 8/08; B60K 1/00; B60K 1/04; B60K 7/0007; B60K 17/356; B63H 21/17; A63H 27/12; B64C 27/00; B64C 39/024; G08G 5/0039; G08G 5/0013; G06T 1/0014; G06T 11/206; G06T 11/60
See application file for complete search history.

(56) References Cited

U.S. PATENT DOCUMENTS

| | | | |
|---|---|---|---|
| 8,567,718 B1 * | 10/2013 | McDonnell | B64C 25/68 244/110 C |
| 8,626,361 B2 | 1/2014 | Gerlock | |
| 8,909,391 B1 | 12/2014 | Peeters et al. | |
| 8,948,935 B1 | 2/2015 | Peeters et al. | |
| 8,989,922 B2 * | 3/2015 | Jones | G05D 1/0088 701/3 |
| 9,051,043 B1 | 6/2015 | Peeters et al. | |
| 9,075,415 B2 * | 7/2015 | Kugelmass | G05D 1/101 |
| 9,174,733 B1 | 11/2015 | Burgess et al. | |
| 9,307,383 B1 | 4/2016 | Patrick | |
| 9,308,986 B1 | 4/2016 | Kanaoka | |
| 9,359,074 B2 | 6/2016 | Ganesh et al. | |
| 9,384,668 B2 | 7/2016 | Raptopoulos et al. | |
| 9,477,938 B1 | 10/2016 | Russell et al. | |
| 9,490,891 B2 | 11/2016 | Frerking et al. | |
| 9,586,683 B1 | 3/2017 | Buchmueller et al. | |
| 2005/0154653 A1 | 7/2005 | Jongebloed | |
| 2006/0226281 A1 | 10/2006 | Walton | |
| 2010/0169199 A1 | 7/2010 | Fuller et al. | |
| 2011/0084162 A1 | 4/2011 | Goossen et al. | |
| 2011/0264311 A1 | 10/2011 | Lee et al. | |
| 2012/0143482 A1 | 6/2012 | Goossen et al. | |
| 2013/0105635 A1 | 5/2013 | Alzu'bi et al. | |
| 2013/0206919 A1 | 8/2013 | Shachor et al. | |
| 2013/0240673 A1 | 9/2013 | Schlosser et al. | |
| 2014/0061362 A1 | 3/2014 | Olm et al. | |
| 2014/0061376 A1 * | 3/2014 | Fisher | B60K 1/00 244/62 |
| 2014/0304107 A1 | 10/2014 | McAllister | |
| 2015/0120094 A1 | 4/2015 | Kimchi et al. | |
| 2015/0158599 A1 | 6/2015 | Sisko | |
| 2015/0175276 A1 | 6/2015 | Koster | |
| 2015/0183528 A1 | 7/2015 | Walsh et al. | |
| 2015/0197335 A1 | 7/2015 | Dekel et al. | |
| 2015/0323932 A1 | 11/2015 | Paduano et al. | |
| 2015/0331427 A1 | 11/2015 | Chaudary | |
| 2016/0016664 A1 | 1/2016 | Basuni | |
| 2016/0068265 A1 | 3/2016 | Hoareau et al. | |
| 2016/0159472 A1 | 6/2016 | Chan et al. | |
| 2016/0163204 A1 | 6/2016 | Raptopoulos et al. | |
| 2016/0221683 A1 | 8/2016 | Roberts et al. | |
| 2016/0272312 A1 | 9/2016 | Mallard | |
| 2018/0155011 A1 | 6/2018 | Greiner et al. | |

FOREIGN PATENT DOCUMENTS

| | | |
|---|---|---|
| CN | 103129737 A | 6/2013 |
| CN | 103869817 A | 6/2014 |
| DE | 102008018901 A1 | 12/2009 |
| EP | 1901153 A1 | 3/2008 |
| EP | 2733070 A2 | 5/2014 |
| WO | 2008/054234 A1 | 5/2008 |
| WO | 2013/098736 A2 | 7/2013 |
| WO | 2013/136902 A1 | 9/2013 |
| WO | 2014/080386 A2 | 5/2014 |
| WO | 2015/155086 A1 | 10/2015 |

OTHER PUBLICATIONS

Papachristos et al., Design and Experimental Attitude Control of an Unmanned Tilt-Rotor Aerial Vehicle. The 15th International Conference on Advanced Robotics. pp. 465-470, Jun. 20-23, 2011.

Ryan et al., A mode-switching path planner for UAV-assisted search and rescue. Proceedings of the 44th IEEE Conference on Decision and Control. 6 pages, Dec. 15, 2005.

Sanchez et al., Autonomous Hovering of a Noncyclic Tiltrotor UAV: Modeling, Control and Implementation. Proceedings of the 17th World Conference The International Federation of Automatic Control. pp. 803-808, Jul. 6-11, 2008.

* cited by examiner

UNMANNED DELIVERY

CROSS-REFERENCE TO RELATED APPLICATIONS

This application claims priority to U.S. Provisional Application Ser. No. 61/920,913, filed Dec. 26, 2013, the contents of which are incorporated herein by reference.

BACKGROUND

This invention relates to unmanned delivery of items to specified locations.

Traditionally, delivery companies such as UPS and FedEx deliver items to customers using delivery vehicles (e.g., trucks) which are operated by delivery people. The delivery vehicles travel a predetermined route and deliver packages to customer locations along the route. At the customer location, the delivery person verifies that the delivery location (e.g., customer address) is correct and then leaves the package in a safe place at the delivery location.

In recent years the use of unmanned aerial vehicles (UAVs) has become widespread, particularly in military and recreational applications. Until recently, commercial use of UAVs was limited due to the technological constraints of UAVs (e.g., limited range, poor reliability, etc.) as well as the relatively high cost of UAVs.

Due to advances in technology and an increased prevalence of UAVs, UAVs are becoming cost effective and sufficiently reliable for use in commercial applications.

At the same time, there is a need for a cost effective, efficient means of delivering items to customers over the last miles between a delivery hub/fulfillment center and the customer's location.

Many groups have proposed using drones for delivery: Matternet and TacoCopter. Recently, Amazon.com presented the idea of delivering packages to customer locations over the last mile using autonomous multi-rotor vehicles. It is unclear how the vehicles employed by these groups accurately deliver items, verify that the delivery location is correct, or decide where to safely leave packages.

SUMMARY

In an aspect, in general, a method for unmanned delivery of an item to a desired delivery location includes receiving, at an unmanned vehicle, first data representative of an approximate geographic location of the desired delivery location, receiving, at the unmanned vehicle, second data representative of a fiducial expected to be detectable at the desired delivery location, using the first data to operate the unmanned vehicle to travel to the approximate geographic location of the desired delivery location, upon arriving at the approximate geographic location of the desired delivery location, using the second data to operate the unmanned vehicle to detect the fiducial, and upon detecting the fiducial, operating the unmanned vehicle to travel to the delivery location and deliver the item.

Aspects may include one or more of the following features.

The fiducial may be selected from a group including a two-dimensional code, a QR code, or a bar code. Using the second data to operate the unmanned vehicle to detect the fiducial may include capturing images using a camera mounted on the unmanned vehicle and processing the captured images to determine if the fiducial is represented in the images. Operating the unmanned vehicle to deliver the item may include operating a winch mounted on the unmanned vehicle to lower the item to the ground. Prior to operating the winch to lower the item to the ground, the unmanned vehicle may determine whether any obstructions are present in the delivery location.

Delivery of the item to the delivery location may be aborted if the unmanned vehicle determines that obstructions are present in the delivery location. Operating the unmanned vehicle to deliver the item may include causing the vehicle to drop the item into a receptacle. The receptacle may be configured to soften the landing of the item. Operating the unmanned vehicle to deliver the item may include landing at the delivery location and then dropping the item at the delivery location. The method may also include notifying a customer that the item has been delivered to the delivery location after delivering the item to the delivery location. Notifying the customer may includes one or more of sending an email to the customer or sending a text message to the customer.

The first data representative of an approximate geographic location of the desired delivery location may be determined from a mapping of street addresses to global positioning system coordinates. Using the first data to operate the unmanned vehicle to travel to the approximate geographic location of the desired delivery location may include notifying a customer of an estimated time of arrival of the item at the delivery location. Notifying the customer may include one or more of sending an email to the customer or sending a text message to the customer. The fiducial may include a radio-frequency beacon. The radio-frequency beacon may include a near-field communication radio frequency signal.

Receiving the first data representative of an approximate geographic location of the desired delivery location may include receiving the first data from a mobile device and using the second data to operate the unmanned vehicle to detect the fiducial may include detecting the fiducial as generated from the mobile device. The method may also include updating the first data representative of an approximate geographic location of the desired delivery location as the mobile device moves. The fiducial may be a permanently installed fiducial associated with the delivery location. The fiducial may be a user-printed fiducial.

In another aspect, in genera, a method for unmanned delivery of an item to a desired delivery location includes receiving, at an unmanned vehicle, first data representative of an approximate geographic location of the desired delivery location, receiving, at an unmanned vehicle, second data including a mapping of wireless network identifiers to representations of geographic locations, using the first data to operate the unmanned vehicle to travel to the approximate geographic location of the desired delivery location, and upon arriving at the approximate geographic location of the desired delivery location, using the second data to operate the unmanned vehicle to travel to the delivery location and deliver the item.

Aspects may include one or more of the following features.

Using the second data to operate the unmanned vehicle to travel to the delivery location may include determining the delivery location using triangulation of a plurality of wireless networking signals in an area of the delivery location.

In another aspect, in general, an unmanned aerial vehicle for delivery of a package includes a fuselage including a package bay and a lifting surface, a plurality of rotors affixed to the fuselage, wherein the unmanned aerial vehicle is operable in a first mode with the rotors operating in a substantially horizontal configuration, and the unmanned aerial vehicle is operable in a second mode with at least some of the rotors operating in a substantially vertical configuration.

Aspects may have one or more of the following advantages.

Among other advantages, certain aspects employ a first navigation technology to travel to an approximate area of a delivery location and then use a second navigation technology to very accurately travel to the exact delivery location.

Other features and advantages of the invention are apparent from the following description, and from the claims.

DESCRIPTION

1 Overview

Figure 1:
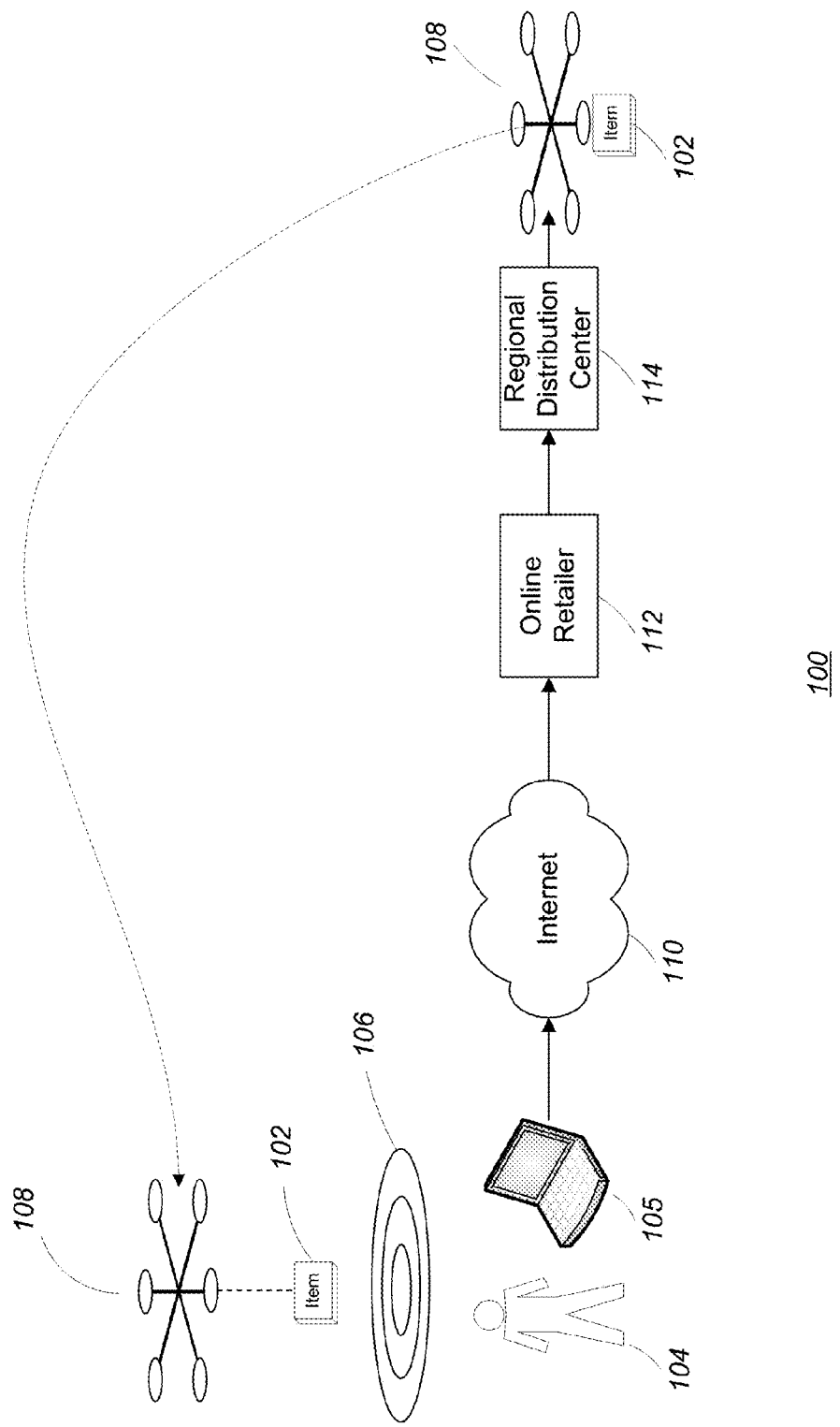
FIG. 1 is an unmanned vehicle delivery system.

Referring to FIG. 1, an unmanned vehicle delivery system 100 receives an order for an item 102 from a user 104 via, for example, a computer 105. Using information included in the order, the system 100 delivers the item 102 to a delivery location 106 specified by the user 104 using an unmanned delivery vehicle 108 (e.g., an unmanned aerial vehicle).

When the user 104 places the order, the order is transmitted over a network 110 (e.g., the internet) to a retailer (e.g., an online retailer) 112 where the order is initially processed. After initially processing the order, the retailer 112 sends order information to a regional distribution center 114 which is located in the same geographical region as the delivery location 106. At the regional distribution center 114, the item 102 is attached to the unmanned delivery vehicle 108. The unmanned delivery vehicle 108 is also programmed with instructions (e.g., GPS coordinates associated with the delivery location 106) for delivering the item to the delivery location 106.

Once the unmanned delivery vehicle 108 has the item 102 attached thereto and is programmed with instructions for delivering the item 102 to the delivery location 106, the unmanned delivery vehicle 108 launches and delivers the item 102 to the delivery location 106.

After delivering the item 102, the unmanned delivery vehicle 108 returns to the regional distribution center 114 where it retrieves another item, is reprogrammed, and repeats the delivery process.

While the general unmanned delivery process described above seems simple, a number of challenges to the process exist. The examples described in detail below address the challenges to the unmanned delivery process and improve the overall performance of the process.

2 Fiducial Landing Pad or Drop Zone

Figure 2:
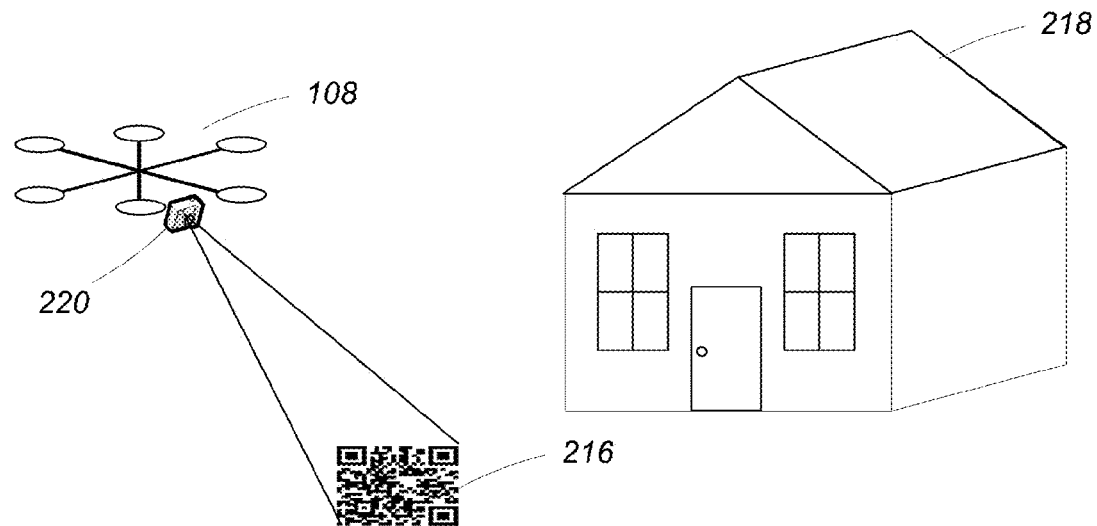
FIG. 2 is an unmanned vehicle detecting a fiducial.

Referring to FIGS. 1 and 2 when a customer orders an item as described in FIG. 1, the customer provides a shipping address (i.e., the address where they want their item delivered). The retailer then provides the customer with a printable fiducial 216. In some examples, the printable fiducial is in the form of a QR code or a bar code which is specific to the customer (and possibly unique to the order). The online retailer then instructs the customer to print the fiducial and to place it outdoors in a location where they want their item to be delivered (i.e., the delivery location 106). In some examples, the online retailer also instructs the customer to place the fiducial in a location that is easily accessible by a UAV (e.g., a location unobstructed by trees, fences, power lines, and so on). The customer prints the fiducial, places the printed fiducial in a location outside of their house 218, and waits.

At the same time at the regional distribution center 114 near the customer's house 218, a package including the customer's item 102 is loaded onto an unmanned aerial vehicle (UAV) 108 (e.g., a multi-rotor UAV) and the UAV 108 is programmed to fly to a Global Positioning System (GPS) coordinate associated with the customer's address. In some examples, the GPS coordinate is obtained from a mapping service such as Google Maps which approximately maps GPS coordinates to street addresses.

Once programmed, the UAV 108 leaves the regional distribution center 114 and flies toward the GPS coordinate associated with the customer's address. When the UAV 108 reaches the GPS coordinate, the UAV 108 begins to fly around the GPS coordinate in an efficient manner. At the same time, a camera 220 on board the UAV 108 is activated and begins taking still photographs or video of the surrounding area. An image processor processes the photographs or video to determine whether the fiducial 216 is present in the photographs or video.

Figure 3:
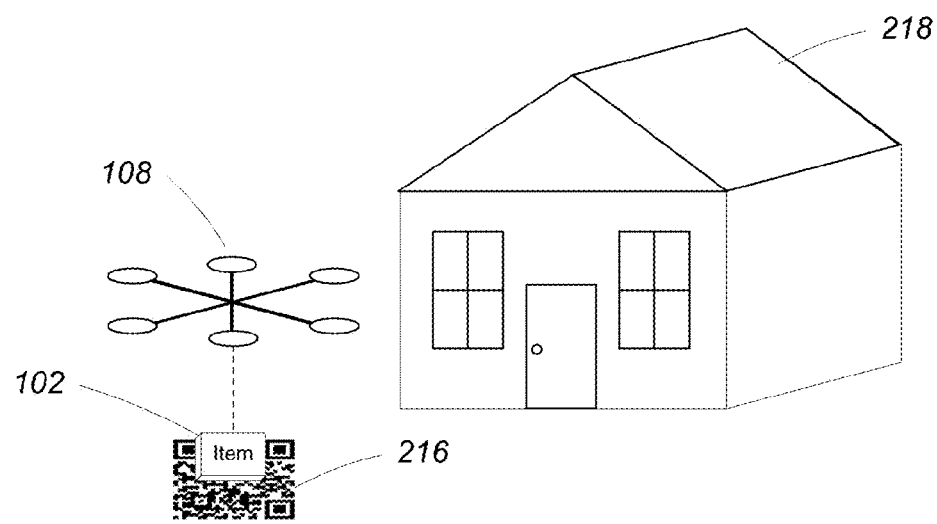
FIG. 3 is an unmanned vehicle delivering a package onto a fiducial.

Referring to FIG. 3, once the fiducial 216 is detected, the UAV 108 flies toward the fiducial 216 until the UAV 108 is directly above the fiducial 216. The UAV 108 then flies to a sufficiently low altitude such that it can safely deliver (e.g., drop) the package including the customer's item 102 onto the fiducial 216.

Once the package has been delivered, the UAV 108 flies back to the regional distribution center 114 where it retrieves the next customer's package and the delivery process repeats.

In some examples, rather than having a customer print out a fiducial for each order, the customer may have a permanent fiducial installed at their location. For example, a customer could install a tile mosaic which appears to be decorative but is actually a re-usable and weatherproof fiducial for UAV delivery.

In some examples, the package is connected to a winch on the UAV. When the UAV arrives above the fiducial, the package is lowered onto the fiducial using the winch. The package is then disconnected from the winch and the winch is retracted before the UAV returns to the regional distribution center. In some examples, if there is a person, animal, or some other object which could potentially be harmed by the lowering of the package, the UAV will not lower the package. In some examples, the package is not lowered onto the fiducial but is instead lowered onto a visual map point.

In some examples, rather than dropping the package onto the fiducial or winching the package down to the fiducial, the UAV simply lands on the fiducial and places the package on the fiducial.

In general, it is not a strict requirement that the package end up directly on the fiducial. For examples, there may be an acceptable margin of error (e.g., a 5 ft. radius around the fiducial) for placement of the package on or around the fiducial.

In some examples, once the package is delivered, the UAV causes a text message, an email, or some other suitable notification to be sent to the customer, indicating that their package has been delivered.

In some examples, as the UAV travels to the customer's location, the UAV communicates with the regional distribution center such that an estimated time of delivery is continually updated. This estimated time of delivery can be provided to the user via any number of communications means (e.g., text message, email, the online retailer's website, and so on).

In some examples, the presence of a fiducial can be used to easily verify that the delivery location is correct and determine where to safely leave packages.

3 Non-Landing Deliveries

Presently, if a person wants to purchase an item, they generally need to either order the item and wait a number of days for the item to be delivered or go out to a store and buy the item there. If a person is out of their home, wants the instant gratification of immediately obtaining an item, and is unable or unwilling to go to a store, they currently have no way of obtaining their item. For example, a person walking around a city may want to purchase a drink for immediate consumption but may not have the time or the desire to walk to a convenience store to purchase the drink. This person would have no way of obtaining their drink.

Figure 4:
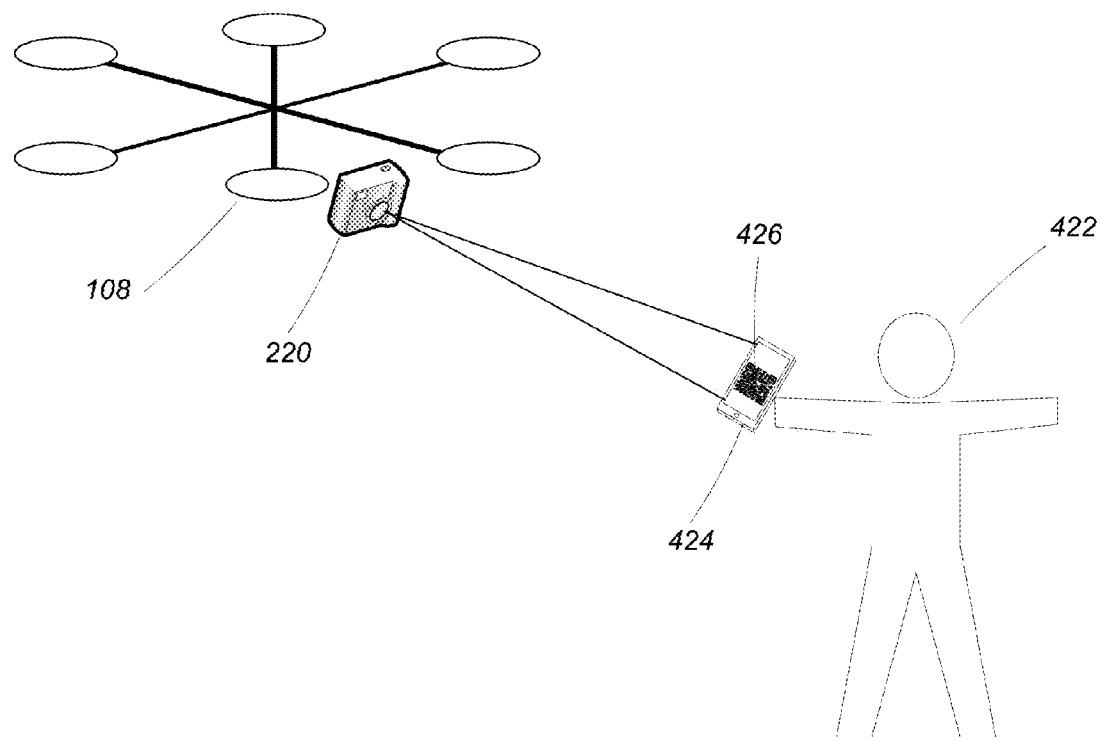
FIG. 4 is an unmanned vehicle detecting a fiducial on a customer's mobile device.
Figure 5:
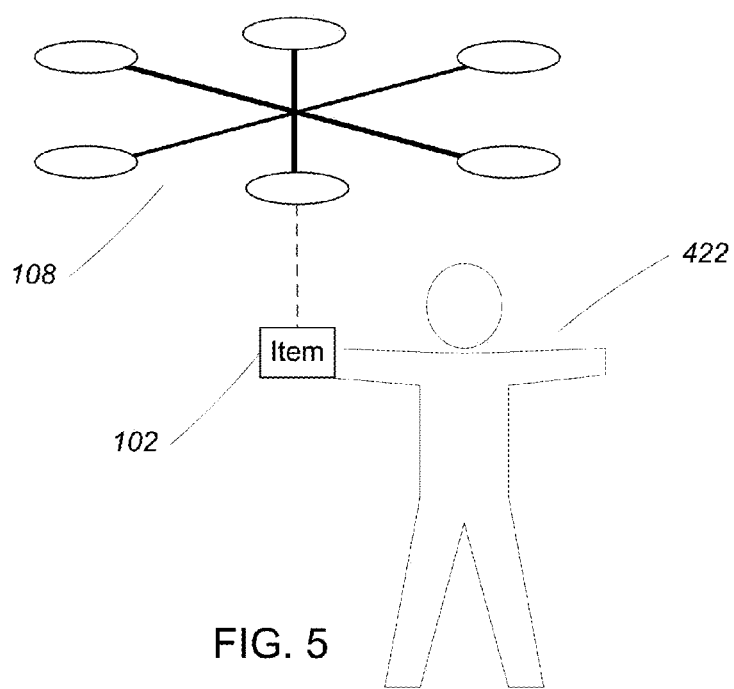
FIG. 5 is an unmanned vehicle delivering a package to a customer.

Referring to FIGS. 4 and 5, in some examples, items can be ordered by a customer 422 using, for example, a mobile device 424 and delivered by an unmanned aerial delivery vehicle 108 (UAV) directly to the customer 422 at the location of their mobile device 424 without ever requiring the UAV 108 to land.

When the customer 422 places their order, order information is sent from their mobile device 424 to a retailer 112 and then to a regional distribution center 114. In some examples, the order information includes an identifier of the ordered item 102 and a location of the customer (e.g., a GPS coordinate).

At the distribution center 114, the ordered item 102 is loaded onto a delivery UAV 108 and the customer's GPS coordinate is programmed into the delivery UAV 108.

Once programmed, the UAV 108 leaves the distribution center 114 and flies toward the GPS coordinate associated with the customer 422. When the UAV 108 reaches the GPS coordinate, the UAV 108 begins to fly around the GPS coordinate in an efficient manner.

At the same time, a validation system (not shown) included in the UAV 108 searches for a validation beacon 426 associated with the customer 422. In some examples, the validation beacon 426 is a fiducial such as a QR code or bar code displayed on the screen of the customer's mobile device 424. In this case, a camera 220 on board the UAV 108 takes still photographs or video of the surrounding area as the UAV 108 flies around the GPS coordinate. An image processor processes the photographs or video to determine whether the fiducial 426 is present in the photographs or video. Once the fiducial 426 is detected, the UAV 108 flies toward the fiducial until the UAV 108 is directly above the fiducial 426 (and presumably the customer 422). The UAV 108 then flies to a sufficiently low altitude such that the item 102 can be safely delivered to the customer 422.

In other examples, the validation beacon is a near-field communications signal such as a Bluetooth signal, a WiFi signal, or an infrared signal. In this case, a sensor such as a Bluetooth, WiFi, or infrared sensor monitors the environment as the UAV flies around the GPS coordinate. When the UAV detects the validation beacon signal the UAV flies in such a way that the received signal strength is maximized. At this point the UAV is presumably closest to the customer. The UAV then flies to a sufficiently low altitude such that the item can be safely delivered to the customer.

In some examples, the UAV delivers the package by flying to an altitude where the customer can grab their item from the UAV. In some examples, the package is touch sensitive such that the customer can touch the package and trigger a release mechanism on the UAV, releasing the package. For example, the package or the payload bay mechanism may be provided with a capacitive sensor which triggers a release mechanism on the UAV.

In some examples, rather than directly handing the package to the customer, the UAV includes a winch which winches the package down to the customer. Such a winching scheme can increase the distance between the customer and the UAV, thereby increasing the safety of the transaction. In some examples, if there is a person, animal, or some other object which could potentially be harmed by the lowering of the package, the UAV will not lower the package. In some examples, the UAV lowers the package onto a point away from but in a vicinity of a person.

In some examples, the customer may be on the move and the customer's mobile device can continually update the UAV with the customer's current GPS coordinate. In this way, the customer's location can be tracked by the UAV and the customer doesn't have to wait in one location for their delivery.

In some examples, the UAV includes an on-board camera which captures still photographs or videos as the UAV flies. When the UAV approaches the customer to make its delivery, a people detection algorithm analyzes the still photographs or videos and recognizes people in the vicinity of the UAV. The UAV then plots a flight path which avoids the recognized people. In some examples, the people detection algorithm or a facial detection algorithm can be used to identify the customer. In this way, the UAV can fly to a position near the customer and make its delivery, even in a crowd of people.

Once the package has been delivered, the UAV flies back to the distribution center where it retrieves the next customer's package and the delivery process repeats.

In some examples, a customer may order an item and provide a GPS coordinate, other than their own, to which the item should be delivered. For example, a customer may purchase an item for their friend and provide their friend's GPS coordinate as the delivery destination. The friend is then sent an indication (e.g., an email or a text message) that the item is being delivered to them. When the item arrives, the friend can validate that the order is for them using any of the validation techniques described above (e.g., presenting a QR code on their mobile device).

4 Visual Location Matching

Mappings of street addresses to GPS coordinates are currently in existence. One example of such a mapping is included in the Google Maps application. These mappings are generally approximate in nature and are not sufficiently accurate to be useful for automated delivery of items to a specific location at an address.

Furthermore, once an automated delivery vehicle (e.g., a UAV) reaches a GPS coordinate associated with a customer's address, there is no way to validate that the GPS coordinate is actually associated with the customer's address.

In this example, existing aerial photography (e.g., satellite images from, e.g., Google Maps) is used to identify a preferred delivery location.

Figure 6:
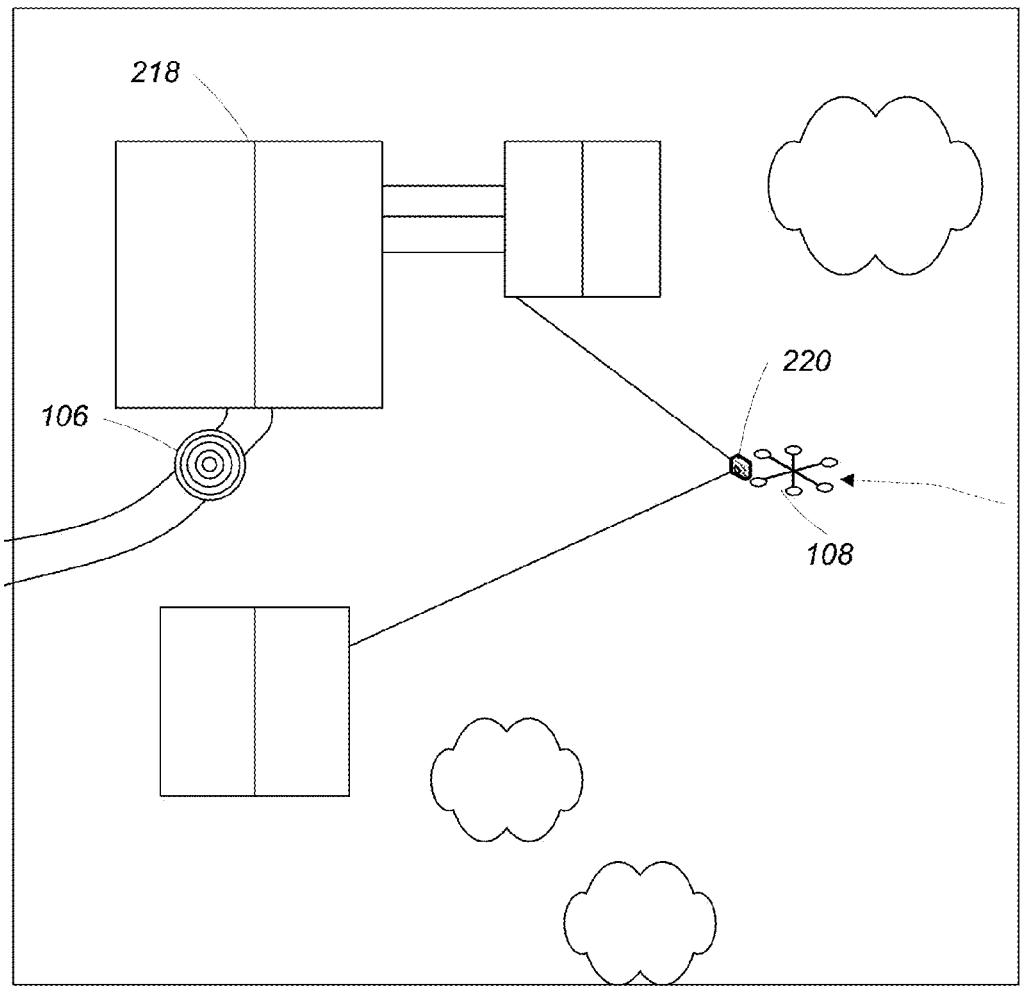
FIG. 6 is an unmanned vehicle performing visual location matching.

Referring to FIGS. 1 and 6, when a customer orders an item from, for example, an online retailer's website, the customer provides a shipping address (i.e., the address where they want their item delivered). The customer is also prompted to select a desired delivery location 106 on a map by placing an icon (e.g., a bullseye or an arrow) on an image of his/her house 218 derived from aerial or satellite imagery, for example, the icon could be placed in the center of a path, a backyard, a driveway, etc.

Subsequently, at a regional distribution center 114 near the customer's house 218, a package including the customer's item is loaded onto a UAV (e.g., a multi-rotor UAV) and the UAV is programmed to fly to a GPS coordinate associated with the desired delivery location 106. In some examples, the GPS coordinate is obtained from a mapping service such as Google Maps.

Once programmed, the UAV 108 leaves the regional distribution center 114 attempts to fly to a position above the specified location or an offset from the specified location and it gets there within the GPS/map registration accuracy. Once the UAV 108 has reached the GPS coordinate associated with the delivery location 106, the UAV 108 is ostensibly in range to capture imagery around the delivery location 106. From this point the UAV 108, augments its navigation with visual imagery by comparing its real time imagery (acquired using a camera 220) with the imagery associated with the user-specified delivery location 106 (e.g., Google Maps imagery). For example, the UAV 108 matches features in the terrain captured in its real time imagery with features from the map, allowing the vehicle to hover over a location that is much closer to the user-specified delivery location 106. The UAV 108 then either lands and makes the drop or lowers the package, including the customer's item onto the user-specified delivery location.

Once the package has been delivered, the UAV 108 flies back to the regional distribution center 114 where it retrieves the next customer's package and the delivery process repeats.

In some examples, the SSID associated with the customer's WiFi network is also programmed into the UAV making it easier to get into range to see the drop-off location. In some examples, WiFi signals emitted by access points in and/or around a customer's house can also be used to accurately deliver an item to a location specified by the customer and to validate that the delivery location is correct.

In some examples, the customer selects the desired drop-off location by pointing to it (mouse of touchscreen) on an aerial image.

One advantage of this approach is that using terrain map in addition to a GPS system (and in some cases a WiFi signal) can result in highly accurate delivery of the customer's item to a customer designated location.

Another advantage of this approach is that imagery can be used to validate that the package is placed where the customer wants it to a greater precision than if GPS alone were used.

In some examples, when the customer places their order, a GPS coordinate associated with specific location on the customer's property (e.g., the customer's doorstep) is provided to the retailer's website. The UAV can then deliver the customer's item to this specific location using the above-described combination of GPS and vision based positioning systems.

In some examples, trees, houses, and large objects can be identified a-priori on the map and then used to geo-reference locally at the delivery site.

5 Wi-Fi Location Validation

As is described above, mappings of street addresses to GPS coordinates such as those included in the Google Maps application are generally approximate in nature and are not sufficiently accurate to be useful for automated delivery of items to a specific location at an address. For situations where GPS is not sufficiently accurate or is unreliable, companies such as Google, Skyhook, and Navizon have developed WiFi positioning systems which rely on a mapping of wireless access points to GPS coordinates. In some examples, WiFi positioning systems use these mappings to triangulate a location of a device (e.g., a smart phone or a UAV) based on a measured received signal strength from a number of access points which are both in the vicinity of the device and represented in the mapping.

Furthermore, once an automated delivery vehicle (e.g., a UAV) reaches a GPS coordinate associated with a customer's address, there is no way to validate that the GPS coordinate is actually associated with the customer's address.

To solve these problems, WiFi signals emitted by access points in and/or around a customer's house can be used to accurately deliver an item to a location specified by the customer and to validate that the delivery location is correct.

Figure 7:
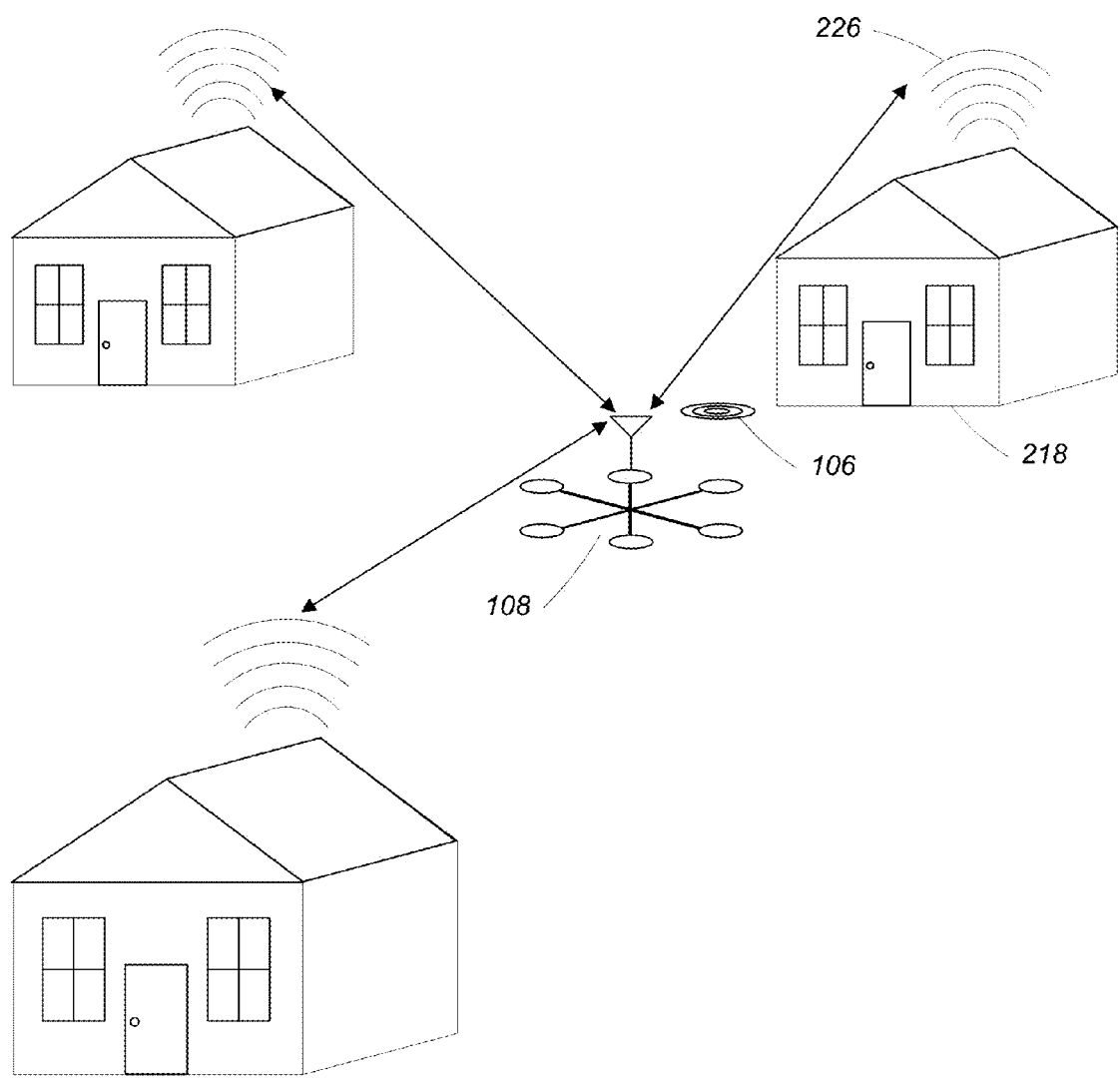
FIG. 7 is an unmanned vehicle navigating using WiFi signals.

Referring to FIGS. 1 and 7 when a customer orders an item 102 from, for example, an online retailer's website, the customer provides a shipping address (i.e., the address where they want their item delivered). In some examples, identifying information related to the customer's WiFi network 226 (e.g., the Service Set Identifier (SSID) for their WiFi network) is also provided to the retailer's website.

Subsequently, at a regional distribution center 114 near the customer's house 218, a package including the customer's item 102 is loaded onto a UAV 108 (e.g., a multi-rotor UAV) and the UAV 108 is programmed to fly to a GPS coordinate associated with the customer's address. In some examples, the GPS coordinate is obtained from a mapping service such as Google Maps which approximately maps GPS coordinates to street addresses. In some examples, the SSID associated with the customer's WiFi network 226 is also programmed into the UAV 108.

Once programmed, the UAV 108 leaves the regional distribution center 114 and flies toward the GPS coordinate. Once the UAV 108 has reached the GPS coordinate associated with the customer's address, the UAV 108 is ostensibly in range of the WiFi network with identifying information (e.g., SSID) which matches the identifying information provided by the customer. At this point, the UAV 108 enables a WiFi signal sensor associated with a WiFi positioning system in addition to its GPS system. In general, the WiFi positioning system utilizes a mapping of access points associated with surrounding WiFi signals to GPS coordinates to pinpoint the UAV's 108 location. In some examples, such a mapping is provided by a third party such as Google Location Services, Navizon, or SkyHook.

Figure 8:
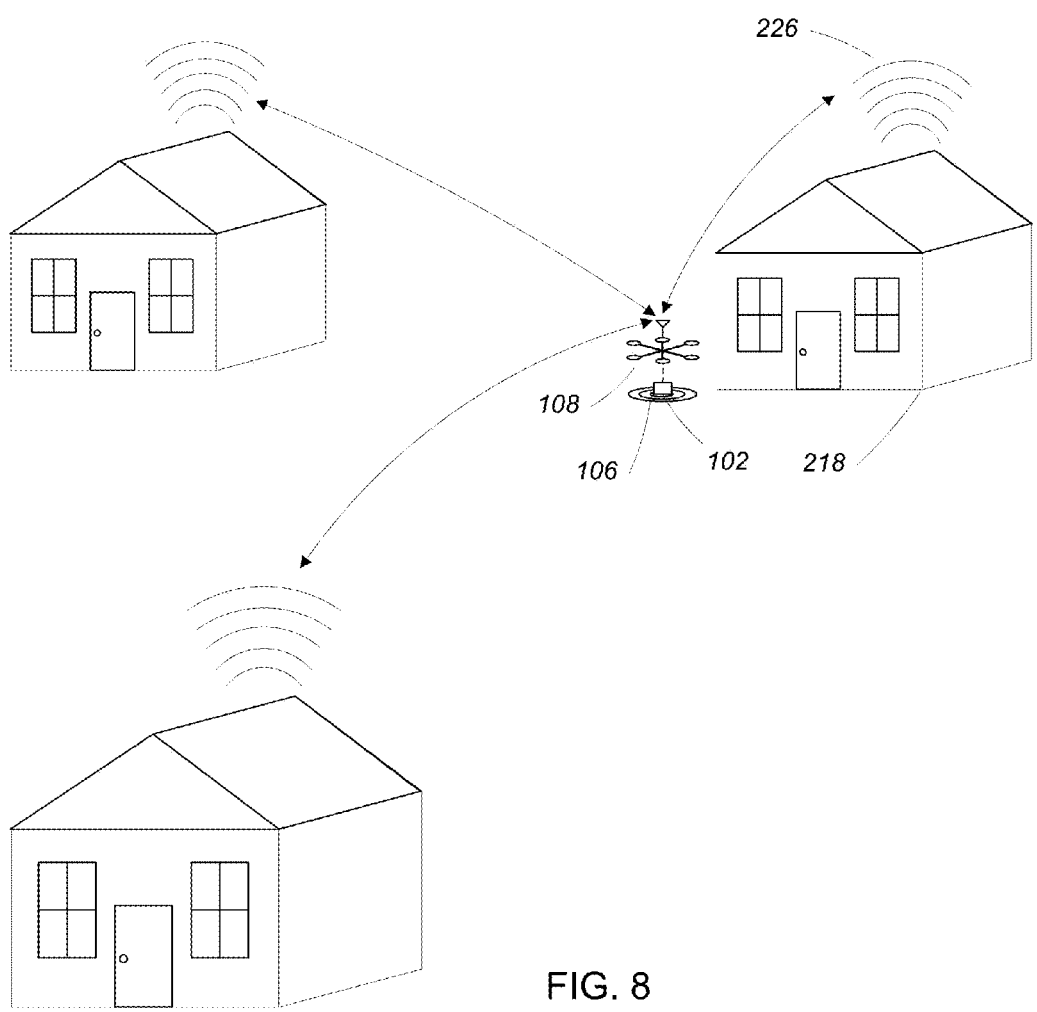
FIG. 8 is an unmanned vehicle delivering a package to a delivery site using WiFi signals.

Referring to FIG. 8, The UAV 108 uses the WiFi positioning system to efficiently move in a direction toward the WiFi signal associated with the SSID provided by the customer (and presumably toward their actual address). At some point (e.g., when it is determined that the received signal strength of the customer's WiFi signal is above a threshold) the UAV 108 is considered to be at the delivery location 106 at the customer's address. At this point the UAV 108 flies to a sufficiently low altitude such that it can safely deliver (e.g., drop) the package including the customer's item 102 onto the customer's lawn.

Once the package has been delivered, the UAV flies back to the regional distribution center where it retrieves the next customer's package and the delivery process repeats.

One advantage of this approach is that using a WiFi positioning system in addition to a GPS system can result in highly accurate delivery of the customer's item to the customer's location.

Another advantage of this approach is that an SSID of the customer's wireless network (provided by the customer) can be used to validate that the UAV is delivering the customer's item to the customer's address.

In some examples, when the customer places their order, a GPS coordinate associated with specific location on the customer's property (e.g., the customer's doorstep) is provided to the retailer's website. The UAV can then deliver the customer's item to this specific location using the above-described combination of GPS and WiFi positioning systems.

In some examples, rather than determining the customer's GPS coordinates from a service such as Google maps, the customer's GPS coordinates are determined by consulting a database which maps identifying information of WiFi networks (e.g., SSIDs) to GPS coordinates. In particular, such a database is searched for the SSID associated with the customer's WiFi network and, if found, the GPS coordinate associated with the SSID is used as the delivery coordinate.

In some examples, as the UAV travels around the regional distribution center delivering packages, the UAV monitors WiFi networks in the area to create its own database relating WiFi networks and GPS coordinates. This database can be used in conjunction with the WiFi positioning system described above.

6 Commercial Courier Applications

Even with the advent of electronic communications such as email text messaging, there is still a need for communication via paper. One common example is a document (e.g., a contract) which requires original signatures. The completion of such documents is often a time sensitive matter, requiring the signing of the document to be completed in a matter of hours.

While delivery using email or text message is nearly instantaneous, an original signature cannot be transmitted using these technologies. Conversely, original signatures can be obtained using services such as the U.S. Postal Service, FedEx, or UPS. However, these services generally take one or more days to deliver documents (even if the documents only need to be delivered across a city).

For this reason, courier services (e.g., bicycle couriers, automobile couriers, and so on) exist. These services involve a human retrieving a small package or document from a sender and quickly delivering the document to a recipient (usually within a small geographic area such as a city). Use of such courier services can be expensive and, since they involve humans, can result in mistakes due to human error.

To overcome some of the drawbacks of using courier services, Unmanned Aerial Vehicles (UAVs) can be used as couriers, delivering documents and small packages between locations within a small geographic area.

Figure 9:
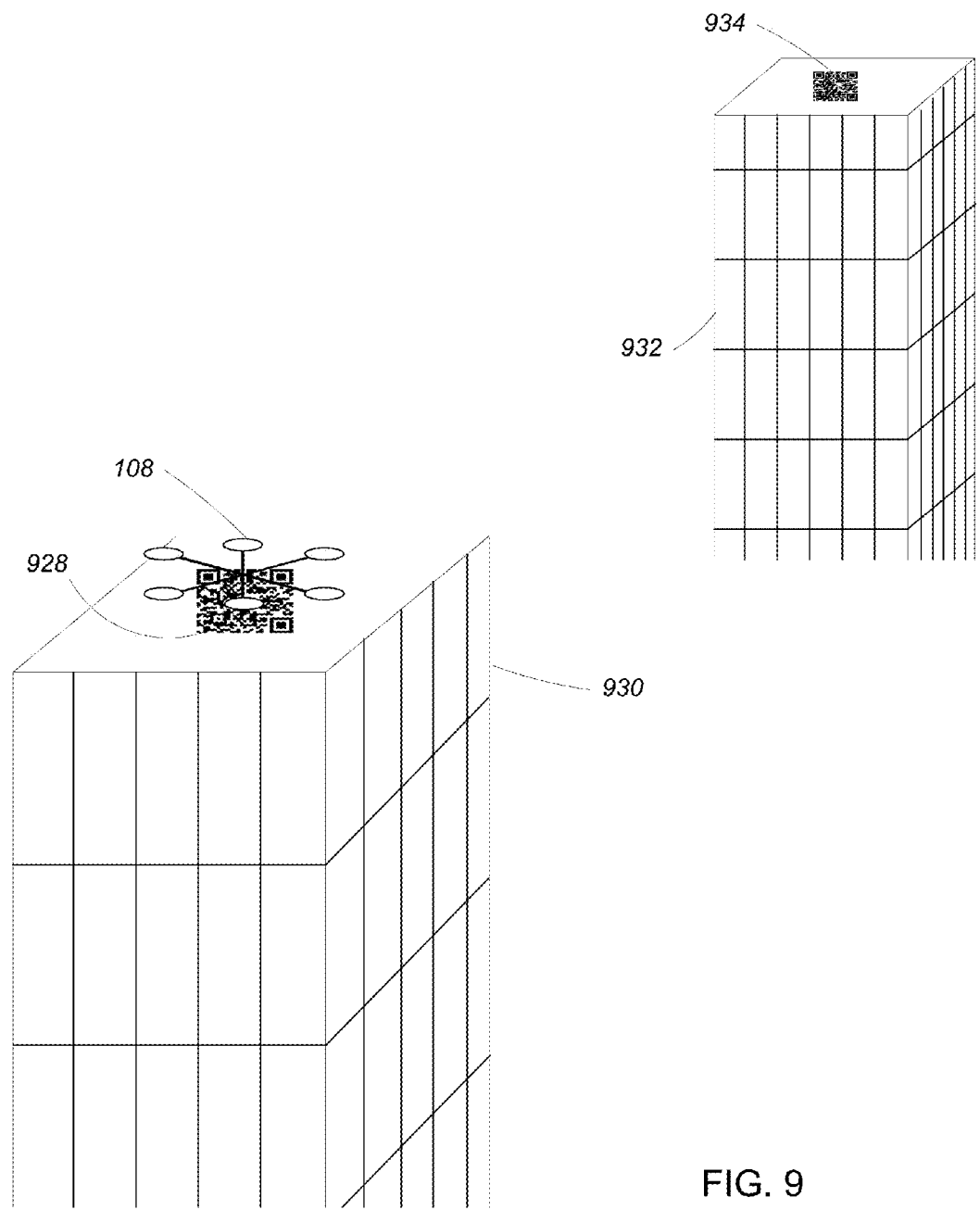
FIG. 9 is an unmanned vehicle courier system.

Referring to FIG. 9, a UAV 108 (e.g., a multi-rotor unmanned aerial vehicle) is parked on a first base station 928 on a roof of a first building 930. A second building 932 has a second base station 934 on its roof. In some examples, each of the base stations 928, 934 includes a fiducial (e.g., a QR code or a bar code) which is visible from the airspace above the base station.

At some point, a first person in the first building 930 needs a document or small package to be delivered to a second person in the second building 932. The first person has their document or package attached to the UAV 108 and indicates to the UAV 108 that the package should be delivered to a person at the second building 932. In some examples, the first person provides an address for delivery and a computer program calculates an approximate GPS coordinate corresponding to the address using a mapping application such as Google Maps.

Figure 10:
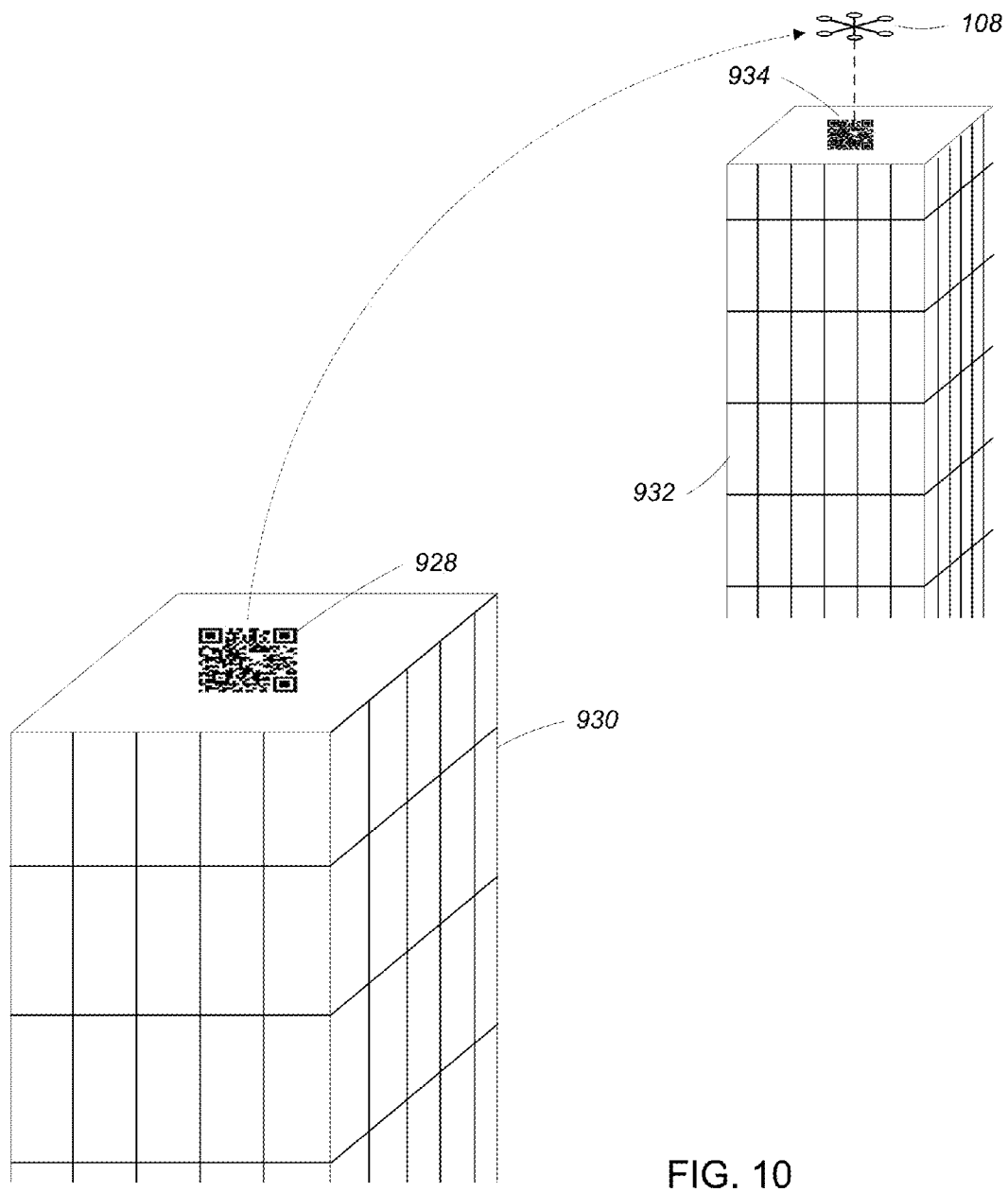
FIG. 10 is an unmanned vehicle courier system delivering an item.

Referring to FIG. 10, once the package is attached to the UAV 108 and the approximate delivery GPS coordinate is programmed into the UAV 108, the UAV 108 launches from the first base station 928 and flies toward the GPS coordinate associated with the delivery location (i.e., the second building 932). When the UAV 108 reaches the GPS coordinate, the UAV 108 begins to fly around the GPS coordinate in an efficient manner. At the same time, a camera on board the UAV 108 is activated and begins taking still photographs or video of the surrounding area. An image processor processes the photographs or video to determine whether the fiducial associated with the second building 932 is present in the photographs or video. Once the fiducial is detected, the UAV 108 flies toward the fiducial and lands on the second base station 934 which is associated with the fiducial.

The UAV 108 then causes a delivery notice (e.g., an email or a text message) to be sent to the second person in the second building 932, indicating that they should retrieve their document or package. The second person then retrieves their document or package, completing the delivery.

In some examples, the base stations on each of the buildings include a charger for the UAV. In such examples, the UAV may stay on the base station of the second building, charging its batteries as it waits for its next courier assignment. In other examples, the UAV may charge its batteries to ensure that it can safely return to the first building where it waits for its next courier assignment.

In some examples, the base stations on each of the buildings include a weather station to monitor the weather. The weather information collected by the base stations can be used to determine whether it is safe for the UAVs to fly from one building to the other.

In some examples, other types of fiducials can be used to accurately land the UAV on the base station. For example, visible or infrared light fiducials can be used.

7 Unmanned Delivery Airframe

Amazon, Matternet, CyPhy Works and others have suggested the use of flying drones for package delivery. These drone prototypes have been portrayed as having a conventional multi-rotor configuration. One of the main technological challenges of this idea is the limited range, endurance and payload that current battery technology imposes on conventional multi-rotor vehicles. In some examples, enhancing these parameters to the point where the use of multirotor vehicles is practical requires a redesign of the multi-rotor configuration.

At present, three main flying drone configurations have been used to deliver payloads: airplanes, multi-rotors and helicopters. For the proposed application the use of airplanes, which have an excellent range, endurance and payload capabilities, is not practical since they lack the VTOL and hovering capabilities to perform an accurate delivery. Multi-rotors and helicopters as previously mentioned require more power and have a limited range of operation.

There is a fourth configuration that has been used mostly used in full-scale vehicles, the tilt rotors like the V-22 Osprey and the Bell XV-15 have their propellers on pods at the end of their wings. In hover or at low speed forward flight, the propellers are almost horizontal producing mostly vertical thrust. In forward flight the propellers are tilted forward using most of the thrust for propulsion while the wings provide the lift. These two flying modes result in excellent forward flight characteristics with flying speeds that largely exceed what a helicopter/multi-copter can achieve, while keeping the vertical take off and landing capabilities intact.

Figure 11:
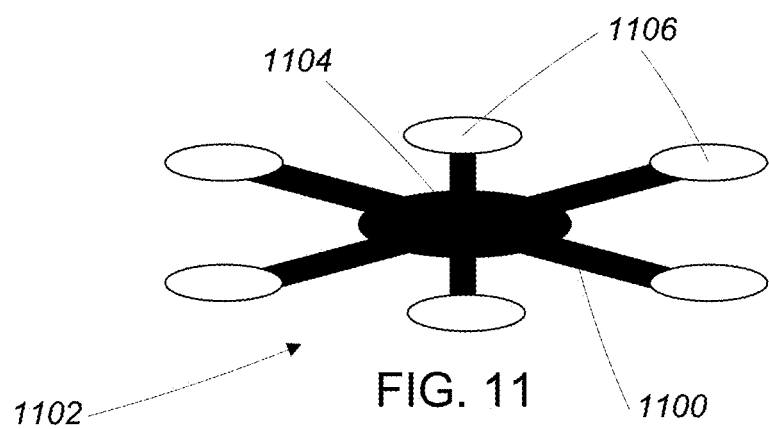
FIG. 11 is an unmanned aerial vehicle in a multi-copter mode.
Figure 12:
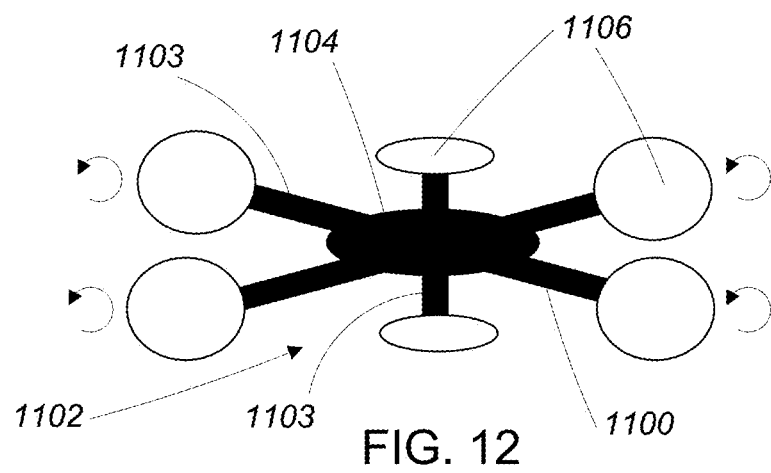
FIG. 12 is an unmanned aerial vehicle in a first forward flight mode.

Referring to FIGS. 11 and 12, a multi-rotor UAV 1102 includes an airframe 1100 which facilitates operation of the UAV 1102 in two modes: a multi-copter mode (FIG. 11) and a forward flight mode (FIG. 12). To enable the two modes of operation, the airframe 1100 includes a streamlined fuselage 1102 which is aerodynamically optimized such that it reduces the drag in forward flight while simultaneously working as a lifting surface. The fuselage is surrounded by an array of an even number of rotors 1106 (e.g., 4, 6, 8, or 10) that tilt back and forth when switching between multi-copter mode and forward flight mode. For example, referring to FIG. 11, in multi-copter mode the rotors 1106 are all in a substantially horizontal configuration (i.e., substantially parallel to the ground) allowing for vertical take-off and landing, hovering, and low speed flight. Referring to FIG. 12, to convert to forward flight mode, at least some of the rotors 1106 tilt or rotate such that they are in a substantially vertical configuration (i.e., substantially perpendicular to the ground) allowing for higher speed forward flight.

In some examples, when the at least some rotors 1106 tilt or rotate from a substantially vertical configuration into a substantially horizontal configuration, the lifting surfaces on the spars 1103 connecting the at least some rotors 1106 to the center of the fuselage 1100 rotate from a substantially horizontal configuration into a substantially vertical configuration. Similarly, when the at least some rotors 1106 tilt or rotate from a substantially horizontal configuration into a substantially vertical configuration, the lifting surfaces on the spars 1103 rotate from a substantially vertical configuration to a substantially horizontal configuration.

In other examples, when the at least some rotors 1106 tilt or rotate between a substantially vertical configuration and a substantially horizontal configuration, the lifting surfaces on the spars 1103 of the at least some rotors 1106 remain in a substantially horizontal configuration.

In operation, the UAV 1102 performs vertical takeoffs and landings (e.g., when hovering to perform package delivery) in multi-copter mode and then switches to forward flight mode (i.e., tilted rotor configuration) when flying over longer distances. The faster speeds and reduced power consumption associated with forward flight mode allow the UAV 1102 to achieve a greater range and endurance than would be possible using a conventional multi-copter.

In some examples, the UAV includes a large internal volume than can hold a payload. For example, the streamlined fuselage 1102 may include a package bay 1104 that holds a payload either by enclosing it on the inside or making the surface of the package part of the fuselage 1102 itself. In some examples, the package bay is inside of the fuselage to ensure that the streamlined aerodynamics of the fuselage are preserved.

Figure 13:
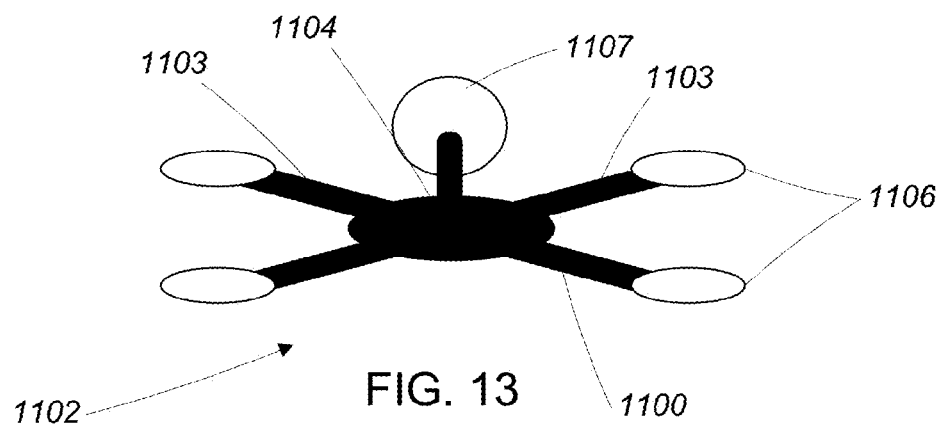
FIG. 13 is an unmanned aerial vehicle in a second forward flight mode.

Referring to FIG. 13 in another configuration, the UAV 1102 includes a streamlined fuselage 1100 including five spars 1103 extending from a central package bay 1104. A number (i.e., four in this case) of the spars 1103 each include a rotor 1106 mounted in a substantially horizontal position relative to the ground for providing vertical thrust for the UAV 1102. One (or more) of the spars 1103 includes a rotor 1107 mounted in a substantially vertical position relative to the ground for providing horizontal thrust for the UAV 1102.

Figure 14:
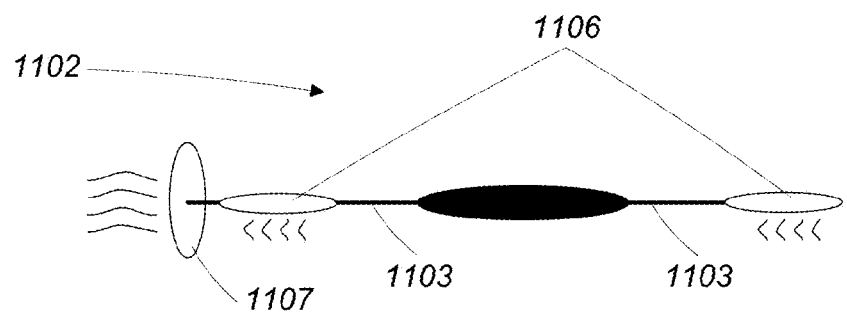
FIG. 14 is a side view of the unmanned aerial vehicle of FIG. 13.

Referring to FIG. 14, in operation, when hovering or traveling over short distances, the rotors 1106 that are mounted in a substantially horizontal position are used primarily, with the rotor 1107 mounted in a substantially vertical position being used little, if at all. When traveling over longer distances, the rotor 1107 mounted in a substantially vertical position relative to the ground acts as a propeller, moving the UAV 1102 in a lateral direction, with the streamlined fuselage 1100 providing lift (i.e., the UAV 1102 'flies' like an airplane). When flying like an airplane, the UAV 1102 may use the rotors 1106 mounted in a horizontal position to provide additional lift, if necessary.

Figure 15:
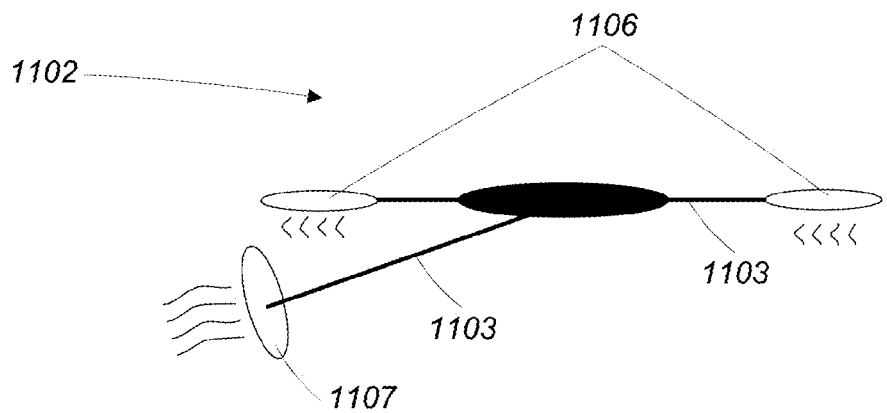
FIG. 15 is a side view of an unmanned aerial vehicle with a rotatable spar and rotor.

Referring to FIG. 15, in some examples, the spar 1103 that the horizontally mounted rotor 1107 is mounted upon is rotatable relative to the other spars 1103 of the UAV 1102. The spar 1103 may be rotated to alter the flight characteristics of the UAV 1102 and/or when the UAV switches between a hovering and a flying mode.

8 Package Receptacles

Figure 16:
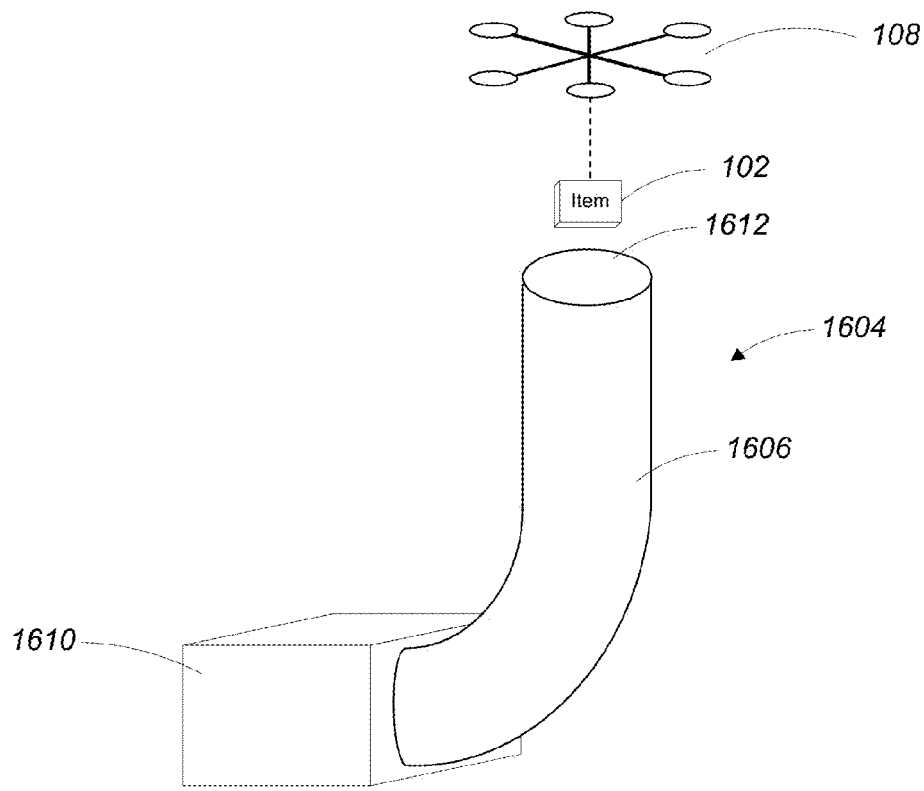
FIG. 16 is a package receptacle including a decelerating slide.

Referring to FIG. 16, in some examples, to ensure that the item 102 being delivered isn't damaged by being dropped from an excessive height, the UAV 108 drops the item 102 into a receptacle 1604 including a decelerating slide 1606 and a container 1601. When the item 102 is dropped into an open end 1612 of the decelerating slide 1606, the item 102 is slowly decelerated as it travels along a gradual bend in the decelerating slide 1606. After passing through the decelerating slide 1606, the item is deposited into the container 1610 where it can be retrieved by a customer.

Figure 17:
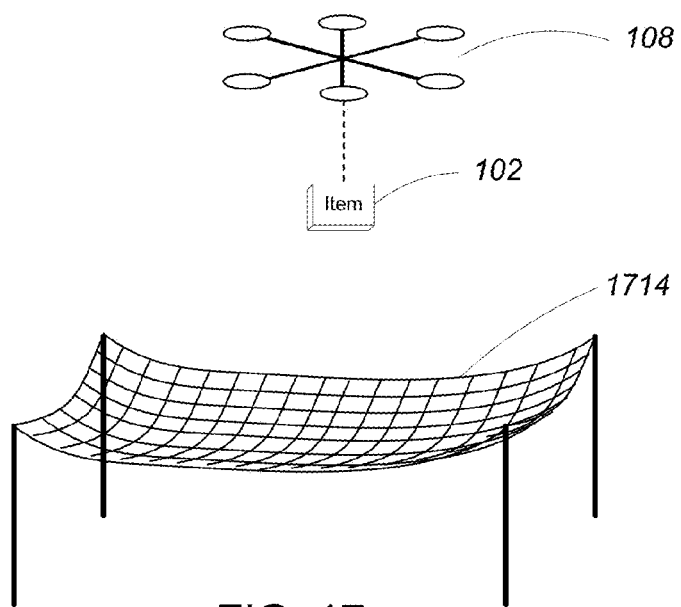
FIG. 17 is a package receptacle including a net.

Referring to FIG. 17, in some examples, to ensure that the item 102 being delivered isn't damaged by being dropped from an excessive height, the UAV 108 drops the item 102 into a net-like structure 1714 which catches and safely decelerates the item 102 before it hits the ground.

9 Packaging

In some examples, to ensure that the item 102 being delivered isn't damaged by being dropped from an excessive height, items may be packaged using packing materials and/or methods which prevent damage due to impact with the ground or other items. For example, products may be packaged such that they are surrounded on all sides by airbags, Styrofoam, honeycombed cardboard, or other cushioning materials.

10 Alternatives

While the above description relates mostly to the use of multi-rotor UAVs, other types of UAVs, such as those well known in the art can be used.

In some examples, the UAV is programmed such that it always moves to a location where there are not people present directly underneath the UAV before it lowers or drops the package.

While many of the UAV airframes described above include an even number of rotors, in some examples, an odd number of rotors can be used (e.g., in cases where one of the rotors is used for lateral movement of the UAV while the other rotors are used to provide vertical thrust).

It is to be understood that the foregoing description is intended to illustrate and not to limit the scope of the invention, which is defined by the scope of the appended claims. Other embodiments are within the scope of the following claims.

What is claimed is:

1. A method for unmanned delivery of an item to a delivery location, the method comprising:
    receiving from a computerized order and delivery system, at a battery-powered unmanned aerial vehicle, first data representative of an approximate geographic location of a delivery location such that the unmanned aerial vehicle is programmed to fly to the approximate geographic location for delivery of an item, the unmanned aerial vehicle including:
        an aerodynamic vehicle body having a flight lifting surface, the vehicle body including a bay to hold a delivery item during flight,
        a sensor attached to the vehicle body the sensor being configured to detect a fiducial indicative of a delivery location, and
        an airframe attached to the vehicle body to support a plurality of rotors, at least one of the plurality of rotors being in a first orientation relative to the vehicle body in a forward flight mode and wherein rotors among the plurality of rotors are operative in a second orientation relative to the vehicle body for take-off, landing or hovering using a second flight mode;
    storing, at the unmanned aerial vehicle, second data representative of a fiducial that is detectable at the delivery location with the sensor;
    using the first data to operate the unmanned aerial vehicle with the at least one rotor oriented in the forward flight mode to travel to the approximate geographic location of the delivery location while the item is held in the bay of the unmanned aerial vehicle;
    using the sensor to detect the fiducial based, at least in part, on the second data while operating the unmanned aerial vehicle, after arriving at the approximate geographic location of the delivery location; and
    upon detecting the fiducial, operating the unmanned aerial vehicle with the plurality of rotors oriented in the second flight mode to travel to the delivery location and deliver the item.

2. The method of claim 1 wherein the fiducial is selected from a group consisting of a two-dimensional code, a QR code, and a bar code.

3. The method of claim 1 wherein using the sensor to detect the fiducial, based, at least in part, on the second data by capturing one or more images using the sensor and processing the one or more captured images to determine if the fiducial is represented in any of the one or more captured images.

4. The method of claim 1 wherein operating the unmanned aerial vehicle to deliver the item includes operating a winch mounted on the unmanned vehicle to lower the item.

5. The method of claim 4 wherein, prior to operating the winch to lower the item, the unmanned aerial vehicle determines whether any obstructions are present in the delivery location.

6. The method of claim 5 wherein delivery of the item to the delivery location is aborted if the unmanned aerial vehicle determines that an obstruction is present in the delivery location.

7. The method of claim 1 wherein operating the unmanned aerial vehicle to deliver the item includes causing the unmanned aerial vehicle to drop the item into a receptacle.

8. The method of claim 1 wherein the at least one rotor oriented in the forward flight mode comprises a vertically oriented rotor and the plurality of rotors further includes at least four rotors mounted in a substantially horizontal orientation for take-off, landing or hovering.

9. The method of claim 1 wherein operating the unmanned aerial vehicle to deliver the item includes landing at the delivery location and then detaching the item from the unmanned aerial vehicle or releasing the item from the unmanned aerial vehicle at the delivery location.

10. The method of claim 1 further comprising transmitting a message from the unmanned aerial vehicle to confirm that the item has been delivered to the delivery location.

11. The method of claim 10 wherein transmitting the message includes one or more of sending an email to the customer or sending a text message to the customer.

12. The method of claim 1 wherein the first data representative of an approximate geographic location of the delivery location is determined from a mapping of street addresses to global positioning system coordinates.

13. The method of claim 1 wherein using the first data to operate the unmanned vehicle to travel to the approximate geographic location of the delivery location includes notifying a customer of an estimated time of arrival of the item at the delivery location.

14. The method of claim 1 wherein the fiducial includes a radio-frequency beacon.

15. The method of claim 14 wherein the radio-frequency beacon includes a near-field communication radio frequency signal.

16. The method of claim 1 wherein receiving the first data representative of the approximate geographic location of the delivery location for delivery of the item includes receiving the first data from a mobile device; wherein the fiducial is generated on or generated by the mobile device; and wherein using the second data to operate the unmanned aerial vehicle to detect the fiducial includes detecting the fiducial as generated on or by the mobile device.

17. The method of claim 16 further comprising updating the first data representative of an approximate geographic location of the delivery location as the mobile device moves.

18. The method of claim 1 wherein the fiducial is a permanently installed fiducial associated with the delivery location or a user-printed fiducial.

19. The method of claim 1, wherein a plurality of rotors are actuatable to tilt relative to the vehicle body during flight between a first mode for take-off, landing, or hovering and the forward flight mode.

20. The method of claim 1, further comprising:
    receiving, at the unmanned aerial vehicle, second data including a mapping of wireless network identifiers to representations of geographic locations; and
    using the sensor and the second data to operate the unmanned vehicle to travel to the delivery location includes determining the delivery location using triangulation of a plurality of wireless networking signals received by the sensor in an area of the delivery location.

21. A battery-powered unmanned aerial vehicle for delivery of an item, the battery-powered unmanned aerial vehicle comprising:
   an aerodynamic vehicle body having a flight lifting surface, the vehicle body including a bay to hold a delivery item during flight;
   a sensor attached to the vehicle body the sensor being configured to detect a fiducial indicative of a delivery location; and
   an airframe attached to the vehicle body to support a plurality of rotors, wherein at least one of the plurality of rotors are operative in a first orientation relative to the vehicle body to travel to an approximate geographic location of a delivery location using a forward flight mode, and wherein at least one of the plurality of rotors are operative in a second orientation relative to the vehicle body for take-off, landing or hovering using a second flight mode;
   wherein the unmanned aerial vehicle is configured to:
   receive, from a computerized order and delivery system, first data representative of an approximate geographic location of a delivery location such that the unmanned aerial vehicle is programmed to fly to the approximate geographic location for delivery of an item;
   storing, at the unmanned aerial vehicle, second data representative of a fiducial that is detectable at the delivery location with the sensor;
   using the first data to operate the unmanned aerial vehicle with the at least one rotor oriented in the forward flight mode to travel to the approximate geographic location of the delivery location while the item is held in the bay of the unmanned aerial vehicle;
   using the sensor to detect the fiducial based, at least in part, on the second data while operating the unmanned aerial vehicle, after arriving at the approximate geographic location of the delivery location; and
   upon detecting the fiducial, operating the unmanned aerial vehicle with the plurality of rotors oriented in the second flight mode to travel to the delivery location and deliver the item.

22. The unmanned aerial vehicle of claim 21, further comprising one or more additional rotors, each additional rotor attached to the vehicle body in a fixed orientation relative to the vehicle body.

23. The unmanned aerial vehicle of claim 21, wherein the vehicle body comprises a streamlined fuselage including a lifting surface.

24. The unmanned aerial vehicle of claim 21, wherein the plurality of rotors are configured to produce mostly vertical thrust when in the first mode orientation and configured to produce mostly horizontal thrust when in the second mode orientation.

25. The unmanned aerial vehicle of claim 24, wherein the plurality of rotors are all in a substantially horizontal configuration when in the first mode orientation and are all in a substantially vertical configuration when in the second mode orientation.

26. The unmanned aerial vehicle of claim 21, further comprising an item holding mechanism including a package bay for holding an item to be delivered.

27. The unmanned aerial vehicle of claim 21, further comprising a winch for lowering an item to be delivered from the unmanned aerial vehicle.

28. The unmanned aerial vehicle of claim 21, wherein the sensor comprises an antenna.

29. The unmanned aerial vehicle of claim 21, wherein the sensor comprises an imaging device.

30. The unmanned aerial vehicle of claim 21, wherein the unmanned aerial vehicle is programmed to validate a delivery location based on data obtained from the sensor.

31. The unmanned aerial vehicle of claim 30, wherein the sensor comprises an antenna and the unmanned aerial vehicle is configured to detect a signal from a validation beacon associated with a delivery location.

32. The unmanned aerial vehicle of claim 30, wherein the sensor comprises an imaging device and the unmanned aerial vehicle is configured and programmed to detect a fiducial associated with the delivery location.

33. The unmanned aerial vehicle of claim 21, wherein the unmanned aerial vehicle is programmed to:
   receive first data representative of an approximate geographic location of a delivery location for delivery of an item;
   store second data representative of a fiducial that is detectable at the delivery location;
   fly to the approximate geographic location of the delivery location, based, at least in part, on the first data, with the plurality of rotors in the first mode while carrying the item;
   detect the fiducial using the sensor, based, at least in part, on the second data, after arriving at the approximate geographic location of the delivery location;
   fly to the delivery location with the plurality of rotors in the second mode; and
   deliver the item by dispensing the item from the delivery bay.

34. The unmanned aerial vehicle of claim 21, wherein the unmanned aerial vehicle is programmed to determine a present location of the unmanned aerial vehicle during flight based on data obtained from the sensor.

35. The unmanned aerial vehicle of claim 21, further comprising:
   a fiducial that is detectable by the sensor;
   wherein the unmanned aerial vehicle is configured to:
      receive an item at a first location using an item attachment or item holding mechanism;
      receive first data representative of an approximate geographic location of a delivery location for delivery of the item;
      store second data representative of a fiducial or a validation beacon expected to be detectable at the delivery location;
      fly from the first location to the approximate geographic location of the second location, based, at least in part, on the first data, with the plurality of rotors in the first mode orientation while carrying the item;
      detect the fiducial using the sensor, based, at least in part, on the second data, after arriving at the approximate geographic location of the delivery location;
      travel to the delivery location with the plurality of rotors in the second mode; and
      deliver the item by dispensing the item from the item attachment or item holding mechanism.

36. The system of claim 35, wherein the fiducial is an image displayed on a screen of an electronic device.

37. The system of claim 35, further comprising a first base station at which the first location is disposed, wherein the first base station comprises a charger for a battery or batteries of the unmanned aerial vehicle.

38. The system of claim 37, further comprising a second base station at the delivery location, wherein the fiducial is disposed at the second base station.

39. The system of claim 38, wherein the second base station comprises a charger for a battery or batteries of the unmanned aerial vehicle.

40. The method of claim 1, wherein the plurality of rotors includes one or more rotors attached to the vehicle body in a fixed orientation relative to the vehicle body.

41. The method of claim 1, further comprising:
operating the unmanned aerial vehicle to take-off with the plurality of rotors oriented in the first mode after the item is attached to or loaded on the unmanned aerial vehicle; and
tilting the plurality of rotors from the first mode into the second flight mode after take-off and during travel to the approximate geographic location of the delivery location.

42. The method of claim 1, further comprising generating an electronic representation of the fiducial.

43. The method of claim 42, further comprising electronically transmitting the electronic representation of the fiducial over a network.

44. The method of claim 42, wherein the electronic representation of the fiducial is generated in response to an order for delivery of the item.

45. The method of claim 44, wherein the fiducial is specific to the order.

46. The method of claim 1, further comprising receiving an order for delivery of an item and receiving information regarding an approximate geographic location from which the order was placed, wherein the first data is obtained from the received information regarding the approximate geographic location from which the order was placed.

47. The method of claim 46, wherein the order was placed from a mobile device and the information regarding the approximate geographic location from which the order was placed is information regarding an approximate geographic location of the mobile device at the time that the order is placed.

48. The method of claim 47, further comprising:
receiving information regarding a current approximate geographic location of the mobile device; and
transmitting updated second data to the unmanned aerial vehicle based on the received the current approximate geographic location of the mobile device.

49. The method of claim 1, further comprising receiving an order for delivery of an item, the order including a user-provided delivery address; wherein the first data is based on a Global Positioning System (GPS) coordinate obtained by mapping the user-provided delivery address to a GPS delivery coordinate.

50. The method of claim 1, wherein the geographic location of the fiducial changes while the unmanned aerial vehicle is being operated to travel to the approximate geographic location of the delivery location.

51. The method of claim 19, wherein the unmanned aerial vehicle includes one or more additional rotors wherein each additional rotor is attached to the vehicle body in a fixed orientation relative to the vehicle body.

52. The method of claim 19, further comprising receiving an order for delivery of an item placed from a device associated with a wireless network having a Service Set Identifier (SSID) and receiving information regarding the SSID of the wireless network; and wherein the first data is based, at least in part, on the SSID.

* * * * *